United States Patent
Matsuura

(10) Patent No.: US 12,228,400 B2
(45) Date of Patent: Feb. 18, 2025

(54) POLARIZING FIZEAU INTERFEROMETER

(71) Applicant: Mitutoyo Corporation, Kanagawa (JP)

(72) Inventor: Shimpei Matsuura, Eindhoven (NL)

(73) Assignee: MITUTOYO CORPORATION, Kawasaki (JP)

(*) Notice: Subject to any disclaimer, the term of this patent is extended or adjusted under 35 U.S.C. 154(b) by 193 days.

(21) Appl. No.: 17/878,318

(22) Filed: Aug. 1, 2022

(65) Prior Publication Data

US 2023/0068859 A1    Mar. 2, 2023

(30) Foreign Application Priority Data

Aug. 27, 2021   (EP) ..................................... 21193604

(51) Int. Cl.
*G01B 9/02056* (2022.01)
*G01B 11/24* (2006.01)

(52) U.S. Cl.
CPC ...... *G01B 9/02057* (2013.01); *G01B 11/2441* (2013.01); *G01B 2290/70* (2013.01)

(58) Field of Classification Search
CPC ............ G01B 9/02057; G01B 11/2441; G01B 2290/70
See application file for complete search history.

(56) References Cited

U.S. PATENT DOCUMENTS

| | | | | |
|---|---|---|---|---|
| 8,072,610 | B1* | 12/2011 | Schmit | G01B 9/0209 356/495 |
| 8,269,980 | B1* | 9/2012 | Szwaykowski | G01B 11/2441 356/504 |
| 11,262,191 | B1* | 3/2022 | Millerd | G01B 9/02057 |
| 2018/0106590 | A1* | 4/2018 | Ishigaki | G01B 9/02081 |
| 2018/0238676 | A1* | 8/2018 | Bååth | G06T 7/521 |

* cited by examiner

*Primary Examiner* — Michelle M Iacoletti
*Assistant Examiner* — Judy Dao Tran
(74) *Attorney, Agent, or Firm* — Rankin, Hill & Clark LLP

(57) ABSTRACT

The invention relates to the field of interferometry, in particular to Fizeau interferometers for improving a contrast of an interferogram. The Fizeau interferometer comprises a light source, a reference surface, a test surface positioned in on a support of the Fizeau interferometer and an imaging system. The Fizeau interferometer utilizes a polarizing reference surface to improve the contrast of the interferogram. The invention further relates to a method for using the Fizeau interferometer of the invention for improving contrast of an interferogram obtained by the Fizeau interferometer.

1 Claim, 4 Drawing Sheets

POLARIZING FIZEAU INTERFEROMETER

CROSS-REFERENCE TO RELATED APPLICATIONS

The present application claims priority to the European Patent Application number 21193604.2, filed on Aug. 27, 2021, the contents of which are expressly incorporated herein by reference in their entirety.

BACKGROUND OF THE INVENTION

The invention relates to the field of interferometry, in particular to Fizeau interferometers for improving a contrast of an interferogram. The Fizeau interferometer comprises a light source, a reference surface, a test surface positioned on a support of the Fizeau interferometer and an imaging system. The invention further relates to a method for using the Fizeau interferometer of the invention for improving contrast of an interferogram obtained by the Fizeau interferometer.

BRIEF SUMMARY OF THE INVENTION

Fizeau interferometer systems may be used to determine properties of a test surface which is positioned in the Fizeau interferometer, e.g. on a test surface support. Using a Fozeai interferometer, an interference pattern, called an interferogram, may be formed by interference of a reference light beam and a test light beam. The reference light beam is a light beam which is reflected by a reference surface and the test light beam is a light beam which is reflected by the test surface. Properties of the test surface, compared to the reference surface, influence the interference pattern. Thus, analyzing the interference pattern allows determination of properties of the test surface. These properties may include properties related to height of the test surface.

In known Fizeau interferometers the test surface and the reference surface are positioned facing each other.

Known Fizeau interferometers comprise a light source for emitting a light beam that travels along a light path, wherein a first part of a light path extends between the light source and a reflective test surface when positioned on a support of the Fizeau interferometer, wherein a reference surface is arranged in the first part of the light path between the light source and the support for the test surface, wherein a second part of the light path extends from the test surface to the reference surface and then to an imaging system of the Fizeau interferometer for measuring light incident from the second part of the light path, wherein the reference surface is partially reflective so that a reference light beam and a test light beam are created, wherein the reference light beam is formed by partial reflection of the light beam emitted by the light source and incident along the first part of the light path, which reference light beam is reflected towards the imaging system along the second part of the light path, and wherein the test light beam is formed by passing of the light beam through the reference surface along the first part of the light path towards the test surface and which test light beam is reflected by the test surface towards the reference surface and then to the imaging system along the second part of the light path, wherein the imaging system is configured for measuring an interferogram generated by interfering the reference light beam and the test light beam.

The test light beam may travel through the reference surface after it is reflected by the test surface.

Optimal performance of Fizeau interferometers improves when the interferogram has a better contrast. Improved optimal performance allows for better measurements performed by the Fizeau interferometer, e.g., it improves axial resolution testing of the test surface. The contrast of the interferogram is close to maximal when the intensity ratio of the reference light beam and the test light beam is close to equal. When the intensity of the reference light beam and the test light beam is close to equal the two beams are said to be balanced.

The intensity ratio between the two light beams may become unequal if, for example, the test surface has poor reflectivity. In such a situation the reference light beam intensity may become higher than the test light beam intensity. This reduces the contrast of the interferogram and thus the performance of the Fizeau interferometer.

Similarly, if the test surface is more reflective than the reference surface, the test beam intensity may become higher than the reference beam intensity. In this situation the contrast of the interferogram is also reduced and the performance of the Fizeau interferometer may be lower than desired.

In known Fizeau interferometers the beam ratio, i.e. the ratio between the reference light beam and the test light beam at the imaging system, is controlled by changing the reflectance of the reference surface. The reflectance of the reference surface may be controlled by replacing the reference surface with a reference surface having another reflectivity. The beam ratio may also be controlled by inserting a so-called neutral density (ND) filter in the light path. In known Fizeau interferometers, the ND filter is normally placed between the reference surface and the test surface.

These methods of controlling the beam ratio require many different reference surfaces and/or ND filters depending on the test surfaces under consideration. The reference surfaces and ND filters need to have reflectances and transmittances, respectively, appropriate for the test surface under consideration. The need for having various reference surfaces and/or ND filters may increase the cost of use of Fizeau interferometers.

Furthermore, for optimal measurements, users of the Fizeau interferometer may be forced to change the configuration of the Fizeau interferometer each time a different test surface is measured, which may have the additional downside of requiring realigning the interferometer. This increases measurement time. Additionally, replacing elements in the system increases the risk of optical system contamination due to dust, fingerprints, etc.

It is an object of the invention to provide a Fizeau interferometer comprising alternative means for improving the contrast of the interferogram generated by the reference light beam and the test light beam.

Accordingly there is provided a Fizeau interferometer according to the present invention including a light source for emitting a light beam that travels along a light path, wherein a first part of the light path extends between the light source and a reflective test surface positioned on a support of the Fizeau interferometer, wherein a reference surface is arranged in the first part of the light path between the light source and the support for the test surface, wherein a second part of the light path extends from the test surface to the reference surface and then to an imaging system of the Fizeau interferometer for measuring light incident from the second part of the light path, wherein the imaging system is configured for measuring an interferogram generated by interfering a reference light beam and a test light beam, characterized in that the reference surface is a polarizing partially reflective reference surface, so that the reference light beam is formed by the reference surface through partially reflection and polarization of the light beam emitted by the light source and incident along the first part of the light path, which reference light beam is reflected by the reference surface towards the imaging system along the second part of the light path, wherein the reference light beam has a first polarization angle, the test light beam is formed by passing of the light beam, which is incident along the first part of the light path, through the reference surface along the first part of the light path towards the test surface, which test light beam is polarized by the reference surface and which test light beam is reflected by the test surface towards the reference surface and then to the imaging system along the second part of the light path, wherein the test light beam has a second polarization angle, wherein the first polarization angle and the second polarization angle are different, and in that the Fizeau interferometer further comprises a first polarizer which is placed between the reference surface and the imaging system in the second part of the light path, wherein the first polarizer is configured to allow light of a third polarization angle to pass towards the imaging system.

The Fizeau interferometer of the invention improves the contrast of the interferogram by polarizing the reference light beam and the test light beam. The reference light beam is formed by partial reflection of the light beam incident on the partial reflective reference surface wherein the reference light beam has a first polarization angle, or equivalently a first polarization. The test light beam is formed by passing of the light beam through the reference surface, wherein the test light beam has a second polarization angle, or equivalently a second polarization. The first and second polarization angle are not the same.

The first polarizer in front of the imaging system aligns the polarization of the reference light beam and the test light beam which allows the two light beams to interfere. The first polarizer allows light of a third polarization to pass towards the imaging system. Thus, both the reference light beam and the test light beam are polarized with the third polarization angle by the first polarizer. The intensity ratio of the two beams reaching the imaging system, and thus the contrast of the interferogram, depends on the third polarization angle. By properly choosing the first polarizer and the corresponding third polarization angle the contrast of the interferogram may be improved.

For example, polarization of a light beam may be decomposed in an x component and a y component. For example, the first polarization of the reference light beam may only have an x component and the second polarization of the test light beam may only have a y component. In case of Cartesian coordinates, the first and second polarization are orthogonal to each other. If the third polarization only has an x component, then the full reference beam is allowed to pass towards the imaging system but the test light beam is blocked by the polarizer. If the third polarization has both an x component and a y component, e.g. equal x and y components, then a part of the reference light beam and a part of the test light beam, e.g. equal parts, are allowed to pass towards the imaging system.

Thus, the third polarization angle determines the beam ratio that reaches the imaging system and improves the contrast of the interferogram.

In an embodiment of the Fizeau interferometer is the first polarizer a first variable angle polarizer such that the third polarization angle is a variable third polarization angle. This embodiment allows to change the third polarization angle, and thus the beam ratio and contrast of the interferogram, by changing the polarization of the first polarizer. Advantageously, it is not required to replace the first polarizer in the Fizeau interferometer with another first polarizer having a different third polarization angle to change the contrast of the interferogram. Preferably the first variable angle polarizer is a dichroic polarizer.

In another embodiment of the Fizeau interferometer a second polarizer is provided between the light source and the reference surface in the first part of the light path, wherein the second polarizer is a second variable angle polarizer which is configured to polarize light travelling in the first part of the light path between the light source and the reference surface, wherein the so polarized light has a variable fourth polarization angle.

The second polarizer controls the beam ratio and thus the contrast of the interferogram by polarizing the light beam traveling in the first part of the light path towards the reference surface. If the light beam traveling towards the reference surface has a fourth polarization angle close to the first polarization angle then a large fraction of the light beam will be reflected by the reference surface and form the reference beam. In contrast, if the light beam traveling towards the reference surface has a fourth polarization angle close to the second polarization angle then a small fraction of the light beam will be reflected by the reference surface and form the reference beam. In both cases the remaining fraction of the light beam will pass through the reference surface and form the test light beam. Thus, by controlling the fourth polarization angle the beam ratio may be controlled, which improves the contrast of the interferogram. This embodiment further advantageously controls the intensity of the test beam as it is incident on test surface by controlling the fourth polarization angle. Preferably, the second polarizer is a variable angle half wave plate.

In embodiments having a first and/or second variable angle polarizer, the first variable angle polarizer and/or the second variable angle polarizer may be a variable angle half wave plate or a variable angle dichroic polarizer. Preferred embodiments notwithstanding, either the first and/or second polarizer may be embodied by any suitable, possibly variable angle, polarizer.

In an embodiment of the Fizeau interferometer, the imaging system is further configured to measure a contrast of the interferogram generated by interfering the reference light beam and the test light beam. The Fizeau interferometer improves the contrast of the interferogram. In this embodiment the imaging system advantageously measures the contrast of the interferogram, which quantifies the effect of changing the third or fourth polarization angle or which more effectively improves the contrast of the interferogram. The imaging system may be configured to measure the contrast by comparing the dark areas of the interferogram with the light areas. The imaging system may be configured to measure the contrast by measuring how well defined the lighter and darker areas are, e.g. by considering sizes of areas having intermediate brightness in the interferogram.

In an embodiment of the Fizeau interferometer the polarizing reference surface is a reflective polarizer, preferably, wherein the polarizing reference surface is a wire grid polarizer. Wire grid polarizers provide efficient reflection and passing through of light under incident light conditions typically found in Fizeau interferometers. Other polarizing reference surfaces may also be used in the invention.

In an embodiment the light source of the Fizeau interferometer is configured for emitting monochromatic light, preferably wherein the light source is a monochromatic laser. In embodiments the wavelength of the light source may be configured depending on the test surface under consideration. For example, a test surface with smaller features to be measured may require a light source emitting light with a smaller wavelength.

In an embodiment of the Fizeau interferometer the reference light beam and the test light beam have orthogonal polarizations.

The invention is further related to a method for determining properties of a test surface, wherein use is made of a Fizeau interferometer of the invention.

The invention is further related to a method for improving a contrast of an interferogram in a Fizeau interferometer, wherein use is made of a Fizeau interferometer comprising a first variable angle polarizer, wherein the method comprises:

illuminating the reference surface and the test surface with the light source;
determining a contrast of the interferogram measured by the imaging system;
varying the third polarization angle to vary the contrast of the interferogram; and
improving the contrast of the interferogram by varying the third polarization angle.

The method steps above may be performed simultaneously, e.g. the third polarization angle may be varied while the reference surface is illuminated and the contrast of the interferogram is being determined. The method steps may also be performed iteratively, e.g. the third polarization angle may be varied various times to determine a third polarization angle which results in an interferogram having a desired contrast.

Improving the contrast of the interferogram may improve optical performance of the Fizeau interferometer. An interferogram having improved contrast may be an interferogram having a higher contrast ratio.

The invention is further relates to a method for improving a contrast of an interferogram in a Fizeau interferometer, wherein use is made of a Fizeau interferometer comprising a second variable angle polarizer, wherein the method comprises:

illuminating the reference surface and the test surface with the light source;
determining the contrast of the interferogram measured by the imaging system;
varying the fourth polarization angle to vary the contrast of the interferogram; and
improving the contrast of the interferogram by varying the fourth polarization angle.

The invention further relates to a Fizeau interferometer comprising a light source for emitting a light beam that travels along a light path, wherein a first part of the light path extends between the light source and a reflective test surface positioned on a support of the Fizeau interferometer, wherein a reference surface is arranged in the first part of the light path between the light source and the support for the test surface, wherein a second part of the light path extends from the test surface to the reference surface and then to an imaging system of the Fizeau interferometer for measuring light incident from the second part of the light path, wherein the imaging system is configured for measuring an interferogram generated by interfering a reference light beam and a test light beam, characterized in that the reference surface is a polarizing partially reflective reference surface, so that the reference light beam is formed by the reference surface through partially reflection and polarization of the light beam emitted by the light source and incident along the first part of the light path, which reference light beam is reflected by the reference surface towards the imaging system along the second part of the light path, wherein the reference light beam has a first polarization angle, the test light beam is formed by passing of the light beam, which is incident along the first part of the light path, through the reference surface along the first part of the light path towards the test surface, which test light beam is polarized by the reference surface and which test light beam is reflected by the test surface towards the reference surface and then to the imaging system along the second part of the light path, wherein the test light beam has a second polarization angle, wherein the first polarization angle and the second polarization angle are different, and in that the Fizeau interferometer further comprises a first polarizer which is placed between the reference surface and the imaging system in the second part of the light path, wherein the first polarizer is configured to allow light of a third polarization angle to pass towards the imaging system, wherein the first polarizer is a first variable angle polarizer such that the third polarization angle is a variable third polarization angle, or wherein the Fizeau interferometer further comprises a second polarizer which is provided between the light source and the reference surface in the first part of the light path, wherein the second polarizer is a second variable angle polarizer which is configured to polarize light travelling in the first part of the light path between the light source and the reference surface, wherein the so polarized light has a variable fourth polarization angle.

The invention further relates to a fizeau interferometer comprising a light source for emitting a light beam that travels along a light path, wherein a first part of the light path extends between the light source and a reflective test surface positioned on a support of the Fizeau interferometer, wherein a reference surface is arranged in the first part of the light path between the light source and the support for the test surface, wherein a second part of the light path extends from the test surface to the reference surface and then to an imaging system of the Fizeau interferometer for measuring light incident from the second part of the light path, wherein the imaging system is configured for measuring an interferogram generated by interfering a reference light beam and a test light beam, characterized in that the reference surface is a polarizing partially reflective reference surface having a variable polarization angle, so that the reference light beam is formed by the reference surface through partially reflection and polarization of the light beam emitted by the light source and incident along the first part of the light path, which reference light beam is reflected by the reference surface towards the imaging system along the second part of the light path, wherein the reference light beam has a first polarization angle, the test light beam is formed by passing of the light beam, which is incident along the first part of the light path, through the reference surface along the first part of the light path towards the test surface, which test light beam is polarized by the reference surface and which test light beam is reflected by the test surface towards the reference surface and then to the imaging system along the second part of the light path, wherein the test light beam has a second polarization angle, wherein the first polarization angle and the second polarization angle are different, and in that the Fizeau interferometer further comprises a first polarizer which is placed between the reference surface and the imaging system in the second part of the light path, wherein the first polarizer is configured to allow light of a third polarization angle to pass towards the imaging system.

In this embodiment of the invention the reference surface is configured to polarize the reference light beam and the test light beam with a variable polarization angle. Similarly to the other embodiments described herein, this controls the beam ratio of the reference light beam and the test light beam and thus the contrast of the interferogram.

DETAILED DESCRIPTION OF THE INVENTION

Embodiments of the invention will now be described, by way of example only, with reference to the accompanying schematic drawings in which corresponding reference symbols indicate corresponding parts.

Figure 1:
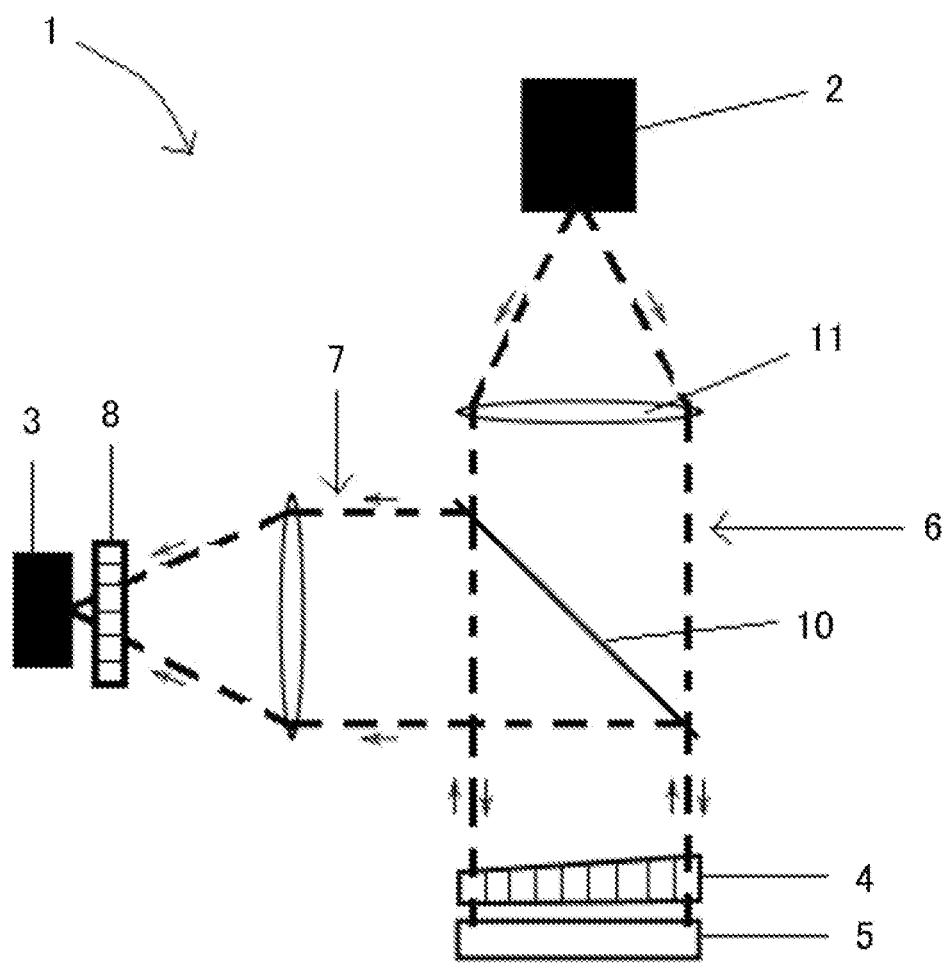
FIG. 1 depicts a Fizeau interferometer comprising a polarizing reference surface and a first polarizer.

FIG. 1 depicts a Fizeau interferometer 1 comprising a polarizing reference surface 4 and a first polarizer 8. The first polarizer 8 of this embodiment is configured to allow light of a third polarization angle to pass towards the imaging system 3.

The Fizeau interferometer 1 comprises a light source 2 for emitting a light beam that travels along a light path comprising a first part 6 and a second part 7. The light source may be a monochromatic light source 2, such as a monochromatic laser. The first part 6 of the light path extends between the light source 2 and the test surface 5 when the test surface 5 is positioned on a support of the Fizeau interferometer 1. The polarizing reference surface 4 is placed between the light source 2 and the test surface 5 in the first part 6 of the light path. The reference surface 4 and the test surface 5 are placed facing each other.

The second part of the light path 7 extends from the test surface 5, to and through the reference surface 4 and then to the imaging system 3. The imaging system 3 is configured for measuring light incident from the second part 7 of the light path. Several lenses 11 are placed in the light path to guide the light along the light path. The second part 7 of the light path partially overlaps the first part of the light path 6. In this embodiment a beam splitter 10 is placed in the light path to send light reflected by the reference surface 4 and the test surface 5 towards the imaging system 3 and allows light from the light source 2 to travel towards the reference surface 4 and the test surface 5. The beam splitter 10 separates the first part 6 of the light path from the second part 7 of the light path.

The imaging system 3 is configured for measuring the interferogram obtained by interfering the reference light beam 32 with the test light beam 31. For example, the imaging system 3 may be connected to computing means to further process the interferogram, such as extract information on the test surface 5 from the interferogram or display the interferogram on a display system. In embodiments of the invention the imaging system 3 may further be configured to directly measure the contrast of the interferogram.

The reference surface 4 is partially reflective so that a reference light beam 32 and a test light beam 31 are formed, wherein the reference light beam 32 is formed by partial reflection of the light beam emitted by the light source 2. The test light beam 31 is formed by passing of the light beam through the reference surface 4 along the first part 6 of the light path towards the test surface 5. The reference light beam 32 is reflected by the reference surface 4 towards the imaging system 2 along the second part 7 of the light path. The test light beam 31 passes through the reference surface 4 along the first part 6 of the light path towards the test surface 5. The test light beam 31 is then reflected by the test surface 5 along the second part 7 of the light beam back towards the reference surface 4 and towards the imaging system 3.

The reference surface 4 is a polarizing reference surface 4 which is configured to reflect light with a first polarization angle and allow light to pass through with a second polarization angle. The first and second polarization angle are different. The reference light beam 32 is polarized with the first polarization angle and the test light beam 31 is polarized with the second polarization angle by the polarizing reference surface.

In embodiments the polarizing reference surface 4 is embodied as a reflective polarizer, preferably the polarizing reference surface 4 is embodied as a wire grid polarizer. An advantage of wire grid polarizers is that wire grid polarizers allow for polarizing the reference and test light beams under incident light conditions typically found in Fizeau interferometers.

The Fizeau interferometer 1 further comprises a first polarizer 8, which is placed between the reference surface 4 and the imaging system 3 in the second part 7 of the light path. The first polarizer 8 is configured to allow light of a third polarization to pass towards the imaging system 3. In embodiments the first polarizer 8 is embodied as a half wave plate or a dichroic polarizer. Other embodiments of the first polarizer are possible.

By polarizing the light using the polarizing reference surface 4, the reference light beam 32 and the test light beam 31 have different polarizations. It is known that light beams having different polarizations do not interfere optimally. The first polarizer 8 aligns the polarization of the reference light beam 32 and the test light beam 31 and allows the light beams to interfere.

Additionally, in this embodiment, the first polarizer 8 selects a relative fraction of the reference light beam 32 compared to the test light beam 31. This is discussed in more detail below with reference to FIGS. 4a-4d.

By selecting a relative fraction of the two light beams the beam ratio between the intensity of the reference light beam 32 and the test light beam 31 is controlled. Consequently, the contrast of the interferogram obtained by interfering the reference light beam 32 with the test light beam 31 may be improved by selecting the proper first polarizer 8 having the proper third polarization angle. This is particularly important when the reflectivity of the test surface 5 is substantially different compared to the reflectivity of the reference surface 4. When the reflectivity of the two surfaces 4,5 differs substantially the contrast of the obtained interferogram decreases and measurements performed by the Fizeau interferometer 1 are negatively affected. This embodiment of the invention provides improved measurements, particularly when the reflectivity of the reference surface 4 and the test surface 5 differs.

Figure 2:
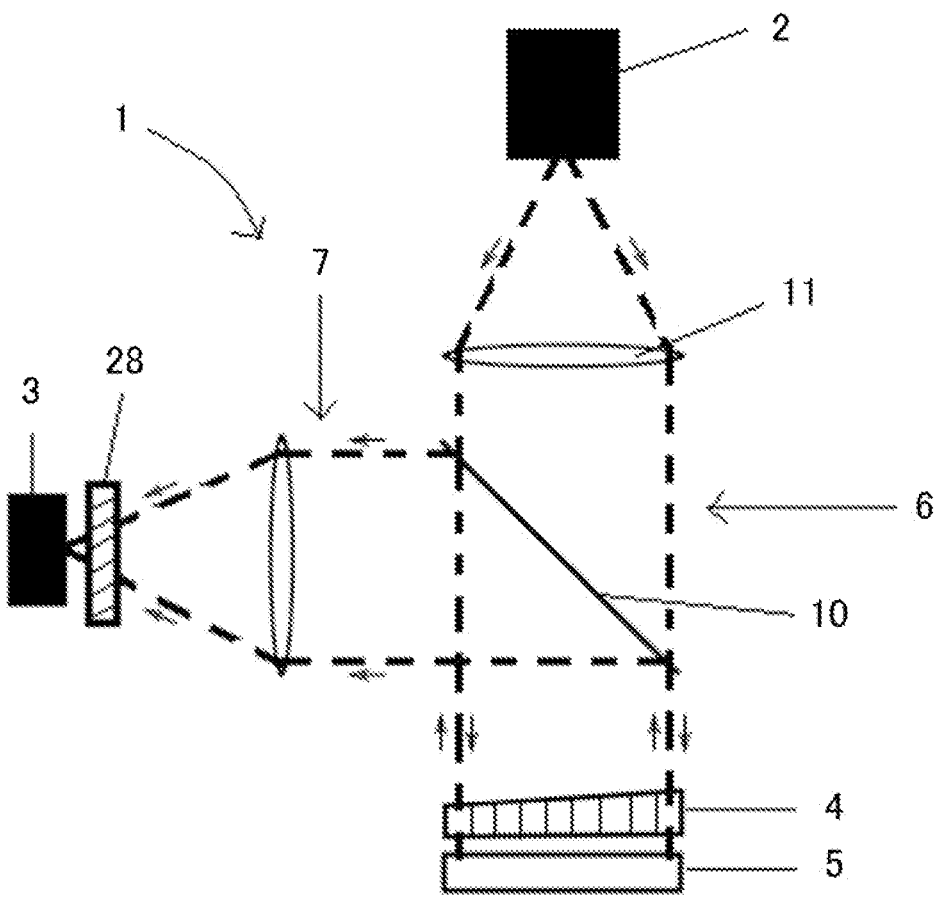
FIG. 2 depicts a Fizeau interferometer comprising a polarizing reference surface and a first polarizer with a variable polarization angle.

FIG. 2 depicts a second embodiment of the Fizeau interferometer 1. The Fizeau interferometer 1 of FIG. 2 comprises a polarizing reference surface 4 and a first polarizer 28. The first polarizer 28 in this embodiment has a variable polarization angle. Other than having a first variable angle polarizer 28, the embodiment of the Fizeau interferometer 1 depicted in FIG. 2 may be the same as the embodiment depicted in FIG. 1.

The first polarizer 28 in the embodiment of FIG. 2 has a variable third polarization angle, which controls the beam ratio of the reference light beam 32 and the test light beam 31 at the imaging system 3. By controlling the beam ratio, the contrast of the interferogram may be improved, e.g. the contrast may be increased. The variable angle first polarizer 28 may be a dichroic polarizer 28.

Figure 3:
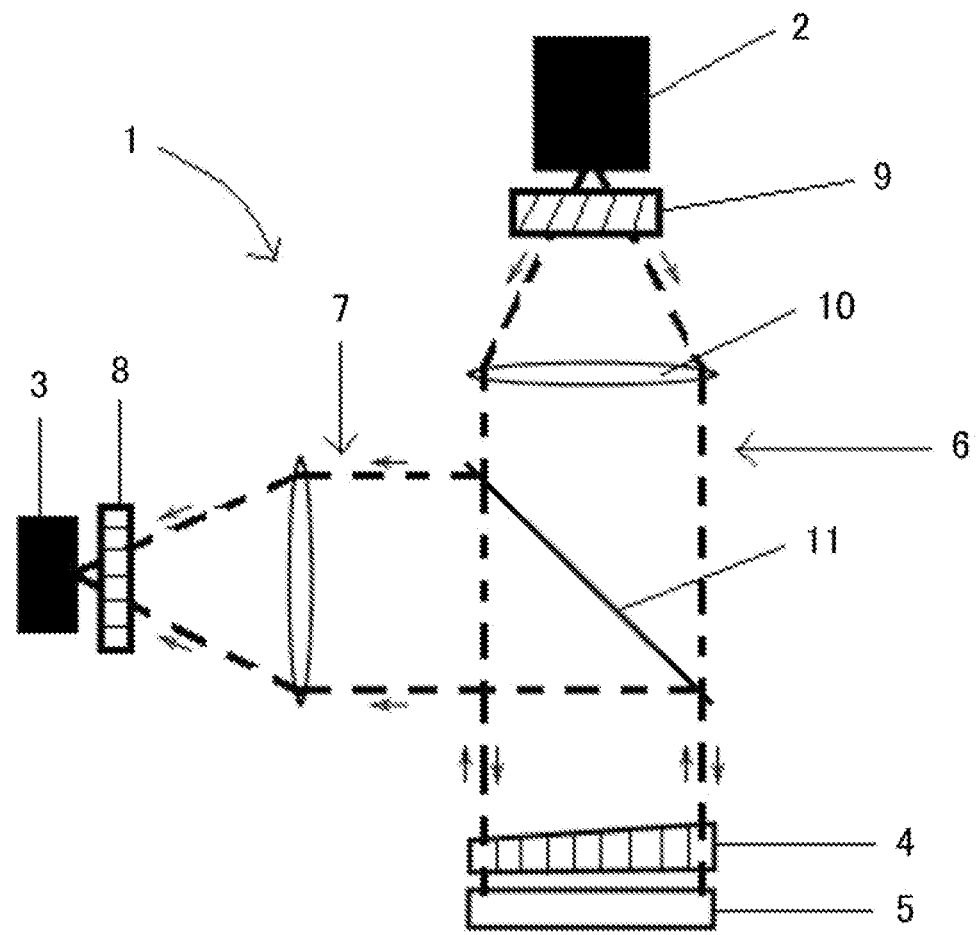
FIG. 3 depicts a Fizeau interferometer comprising a polarizing reference surface, a first polarizer, and a second polarizer.

FIG. 3 depicts a third embodiment of the Fizeau interferometer 1. The Fizeau interferometer 1 of FIG. 3 comprises a second polarizer 9 which is provided between the light source 2 and the reference surface 4 in the first part 6 of the light path, wherein the second polarizer 9 is a second variable angle polarizer 9 which is configured to polarize light travelling in the first part 6 of the light path between the light source 2 and the reference surface 4, wherein the so polarized light has a variable fourth polarization angle.

The second polarizer 9 controls the beam ratio and thus the contrast of the interferogram by polarizing the light beam traveling in the first part 6 of the light path towards the reference surface 4. For example, if the light beam traveling towards the reference surface 4 has a fourth polarization angle close to the first polarization angle then a large fraction of the light beam will be reflected by the reference surface 4 and form the reference beam 32. In contrast, if the light beam traveling towards the reference surface 4 has a fourth polarization angle close to the second polarization angle then a small fraction of the light beam will be reflected by the reference surface 4 and form the reference beam 32. In both cases the remaining fraction of the light beam will pass through the reference surface 4 and form the test light beam 31. By controlling the fourth polarization angle the beam ratio may be controlled, which improves the contrast of the interferogram. This embodiment further advantageously controls the intensity of the test light beam 31 as it is incident on test surface 5 by controlling the fourth polarization angle and thus the fraction of light that passes through the reference surface 4.

Preferably, the second polarizer 9 is embodied as a variable angle half wave plate.

FIGS. 4a, 4b, 4c and 4d depict the polarization of the reference light beam 32 and the test light beam 31 and the effect of the first polarizer 8, 28 thereon. The reference light beam 32 and the test light beam 31 are depicted as arrows in the figures, wherein the length of the arrow indicates an amplitude of the light beam and a direction of the arrow in the x-y plane depicts the polarization of the light beam.

The third polarization angle 33 is indicated by the thinner arrow in the figures.

Figure 4A:
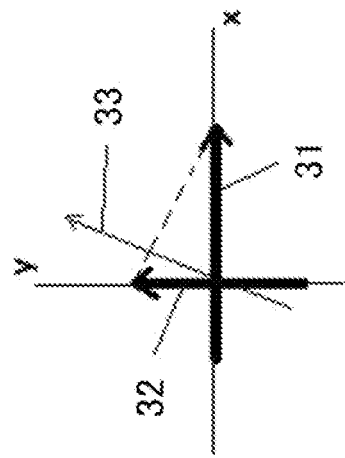
FIGS. 4a, 4b, 4c and 4d depict the polarization of the reference light beam and the test light beam and the effect of the first polarizer thereon.
Figure 4B:
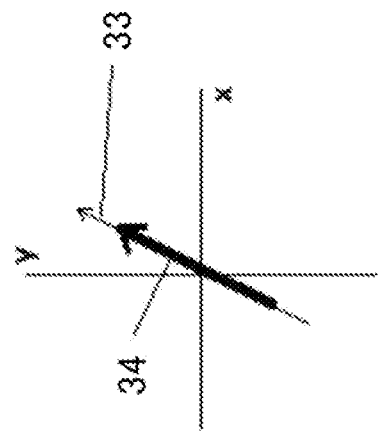
Figure 4C:
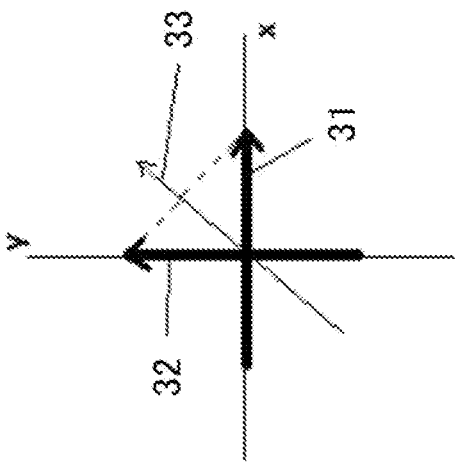

FIGS. 4a and 4c depict the reference light beam 32 and the test light beam 31 before traveling through the polarizer 8, 28 in two different situations.

FIG. 4a depicts the situation wherein the reference light beam 32 and the test light beam 31 have similar amplitudes, and intensities, but are orthogonally polarized. The reference light beam 32 is polarized along the y-axis and the test light beam 31 is polarized along the x-axis. A projection of the light beams on the third polarization angle 33 of the first polarizer 8, 28 is indicated by the dashed line.

As can be seen in FIG. 4b, after the light beams of FIG. 4a have traveled through the polarizer 8, 28, the reference light beam 32 and the test light beam 31 are both aligned with the third polarization angle 33 and both have the same amplitude. In this figure the arrow 34 both indicates both the reference light beam 32 and the test light beam 31. FIGS. 4a and 4b show the situation wherein the reference light beam 32 and the test light beam 31 have the same amplitude and orthogonal polarization. In this case the light beams after the first polarizer have the same intensity if the third polarization angle 33 is at 45 degrees of both the polarizations of the light beams.

Figure 4D:
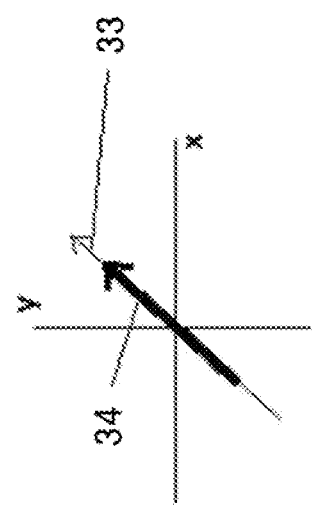

A different situation is shown in FIGS. 4c and 4d. As can be seen from FIG. 4c the polarization of the reference light beam 32 and the test light beam 31 is still orthogonal in this example. However, the test light beam 31 has a greater amplitude than the reference light beam, possibly as a result of a highly reflective test surface 5.

As can be seen in FIG. 4c the third polarization angle 33 is no longer at 45 degrees of both light beams. The effect of this can be seen in FIG. 4d. The resulting reference light beam 32 and test light beam 31 are again indicated by the arrow 34. Also in this example the reference light beam 32 and the test light beam 31 have the same amplitude and polarization after traveling through the first polarizer 8, 28 even though before traveling through the third polarizer 8, 28 the amplitudes of the light beams was different. Thus, the beam ratio before the first polarizer 8, 28 was different from one whereas after the first polarizer 8, 28 the beam ratio is close to one. The effect of the third polarization angle 33 on the amplitudes of the reference light beam 31 and the test light beam 32 can be clearly seen.

Even though FIGS. 4a-4d illustrate the invention making use of the first polarizer 8, 28 to control the beam ratio and the contrast, other embodiments of the invention, e.g. such as those provided with the second polarizer 9 work on the same principle.

The invention claimed is:

1. A method for improving a contrast of an interferogram in a Fizeau interferometer, wherein the Fizeau interferometer comprising a light source for emitting a light beam that travels along a light path, wherein a first part of the light path extends between the light source and a reflective test surface positioned on a support of the Fizeau interferometer, wherein a reference surface is arranged in the first part of the light path between the light source and the support for the test surface, wherein a second part of the light path extends from the test surface to the reference surface and then to an imaging system of the Fizeau interferometer for measuring light incident from the second part of the light path, wherein the imaging system is configured for measuring an interferogram generated by interfering a reference light beam and a test light beam, wherein the reference surface is a polarizing partially reflective reference surface, so that the reference light beam is formed by the reference surface through partial reflection and polarization of the light beam emitted by the light source and incident along the first part of the light path, which the reference light beam is reflected by the reference surface towards the imaging system along the second part of the light path, wherein the reference light beam has a first polarization angle, the test light beam is formed by passing of the light beam, which is incident along the first part of the light path, through the reference surface along the first part of the light path towards the test surface, which the test light beam is polarized by the reference surface and which the test light beam is reflected by the test surface towards the reference surface and then to the imaging system along the second part of the light path, wherein the test light beam has a second polarization angle, wherein the first polarization angle and the second polarization angle are different, and wherein the Fizeau interferometer further comprises a first polarizer which is placed between the reference surface and the imaging system in the second part of the light path, wherein the first polarizer is configured to allow light of a third polarization angle to pass towards the imaging system, the first polarizer is a first variable angle polarizer such that the third polarization angle is a variable third polarization angle, and the first polarizer provides control over a beam ratio of the reference light beam and the test light beam at the imaging system to improve a contrast of the interferogram, and wherein the method comprises:
  illuminating the reference surface and the test surface with the light source;
  determining the contrast of the interferogram measured by the imaging system;
  varying the third polarization angle to vary the contrast of the interferogram; and
  improving the contrast of the interferogram by varying the third polarization angle.

* * * * *